Patented Nov. 11, 1924.

1,515,333

UNITED STATES PATENT OFFICE.

ALEXANDER BONNINGTON, OF SOUTH CHARLESTON, WEST VIRGINIA, ASSIGNOR TO WILLIAM H. DAVIS, OF CHARLESTON, WEST VIRGINIA.

METHOD OF MAKING CARBON BLACK.

No Drawing.   Application filed August 25, 1922.   Serial No. 584,275.

*To all whom it may concern:*

Be it known that I, ALEXANDER BONNINGTON, a subject of the King of Great Britain, residing at South Charleston, in the county of Kanawha and State of West Virginia, have invented new and useful Improvements in Methods of Making Carbon Black, of which the following is a specification.

This invention relates to the production of carbon black by the combustion of gases or vapors and has for its principal objects the more effective control of the combustion and the consequent very substantial increase in the yield of carbon black obtained therefrom.

The ordinary method of manufacturing carbon black consists in causing a flame of gas to impinge against a metallic surface and the removal of the carbon black deposited on such surface by means of scrapers or the like. Such a method, however, while practiced on a large scale, is extremely inefficient and but a small percentage of the carbon contained in the gas is obtained in the form of carbon black, due principally to the fact that a major portion of the carbon content of the gas is consumed as carbon dioxide thru difficulty of control of the combustion.

My experiments have led to the discovery that an unusually high yield of carbon black can be obtained by the combustion of gas or vapor provided the combustion is partially quenched or retarded by means of gaseous bodies or vapors which of themselves are incapable of supporting combustion. Not only, as stated, is an increased yield of carbon black thus obtained, but this is accomplished without impairing to any material extent the quality of the product.

The preferred method of carrying out my invention is as follows:

A relatively small percentage of carbon tetrachlorid (CCl$_4$) in a vaporized condition is intimately mixed with natural gas and the mixture so obtained is burned in the usual manner, for example, by causing the same to issue into the atmosphere from a lava tip while ignited and impinge against a metallic surface such as an iron plate. The positive carbon which accumulates on such surface is continuously removed and collected for use.

The amount of carbon tetrachloride which is employed should be insufficient to prevent ignition of the mixture or its extinguishment after ignition. On the other hand, the amount of carbon tetrachloride employed should be sufficient to result in the effective quenching or retardation of the combustion in order that the temperature will not be so intense as to result in the excessive consumption of the carbon component of the natural gas and thus materially reduce the yield of carbon black which is obtained. I have found that a suitable proportion of carbon tetrachloride is from $\frac{1}{10}$% to three per cent by weight of the natural gas mixed therewith, though obviously various other proportions may be employed without departing from the spirit of the invention herein described.

The carbon tetrachloride may be introduced into the gas used in any suitable manner, either by causing drops of the former to mingle with a flowing current of the latter or by causing a current of the natural gas to bubble thru or pass over carbon tetrachloride, whereby carbon tetrachloride vapors will be taken up by the gas and become intimately mingled therewith.

The theory of the operation of the invention, it is believed can be best explained as a quenching action or one which prevents the reaction occurring so rapidly as to raise the temperature of the ignited mixture to the maximum point which would be obtained were no carbon tetrachloride or similar retardant present. As a result the heat of reaction from the combustion of the hydrogen component of the gas with the oxygen in the surrounding air in which the burner is enveloped is insufficient to effect the decomposition of all the carbon dioxide which may have been formed by the reaction of the atmosphere upon the carbon component of the gas, into carbon monoxide, with the consequent consumption of an extra atom of carbon.

While I preferably employ carbon tetrachloride as the quenching or retarding agent, other halogenated hydrocarbon derivatives as ethelyene tetrachloride and other volatilizable compounds incapable of themselves supporting combustion, such for example as sulfur chloride, may be employed within the limits above prescribed, without departing from the spirit of my invention. The retarding agent should be incapable of leaving an appreciable and objectionable ash residue in the resultant carbon black under the temperature conditions prevailing in the reaction.

The function of the carbon tetrachloride appears to be more of the nature of a retarding catalyst in so far as its smothering or quenching effect is concerned, since a substantial amount if not all of the carbon tetrachloride which is relatively stable under the reaction conditions can be recovered from the products of the reaction. Obviously, any carbon tetrachloride so recovered will be suitable for reuse in the process.

While I prefer to employ natural gas, the invention is equally applicable for the production of carbon black from coal gas, carburetted water gas, oil gas and like combustible carboniferous substances which yield carbon black in commercial quantities on incomplete combustion thereof.

The term gaseous as used in the claims is intended to embrace both permanent gases as well as substances in a volatilized or vaporized condition.

The term carbon black is used generically to include the carbon black obtained from gas as well as the carbon black obtained from the burning of oil and like substances capable of yielding carbon black.

Having thus described my invention, what I claim and desire to secure by U. S. Letters Patent is:

1. The process of making carbon black, which consists in effecting the incomplete combustion of natural gas in the atmosphere in the presence of carbon tetrachloride, the proportion of such carbon tetrachloride being insufficient to extinguish the natural gas flame during its combustion and yet sufficient to substantially effect a partial smothering of the reaction, effecting the deposit of the resultant particles of carbon black on a surface and then collecting such carbon black particles.

2. In the process of making carbon black, the step which consists in controlling combustion between a substance, including carbon in its composition and capable of yielding carbon black upon incomplete combustion thereof, and atmospheric air by effecting the combustion in the presence of a gaseous substance which of itself is incapable of supporting combustion of the substance so treated, the proportion of the gaseous substance being insufficient to prevent the uninterrupted combustion of such substance so treated and yet sufficient to substantially effect a partial smothering action.

3. In the process of making carbon black, the step which consists in effecting the incomplete combustion of natural gas in air in the presence of a relatively small quantity of vaporized carbon tetrachlorid.

4. In the process of making carbon black, the step which consists in effecting the incomplete combustion of natural gas in the presence of a hydrocarbon halogen compound which of itself is incapable of supporting combustion of such natural gas.

5. In the process of making carbon black, the step which consists in effecting the incomplete combustion of a compound, including carbon in its composition and capable of yielding carbon black upon the incomplete combustion thereof, in the presence of a halogen compound which of itself is incapable of supporting combustion of such natural gas, the proportion of such halogen compound being insufficient to prevent the uninterrupted combustion of the compound treated.

6. In the process of making carbon black, the step which consists in effecting the incomplete combustion of a compound, including carbon in its composition and capable of yielding carbon black upon the incomplete combustion thereof, in the presence of from a fraction of one per cent to not over three per cent of a halogen compound which of itself is incapable of supporting combustion of such compound but is capable of exerting a partial smothering action upon the flame produced by such combustion without however extinguishing such flame.

Signed at New York city, in the county and State of New York this 24th day of August, 1922.

ALEXANDER BONNINGTON.